United States Patent [19]

Baslow

[11] 4,163,882
[45] Aug. 7, 1979

[54] ADAPTER FOR STANDARD ELECTRICAL WALL FIXTURES

[76] Inventor: Floyd M. Baslow, 100 Lafayette St., New Bethlehem, Pa. 16242

[21] Appl. No.: 857,599

[22] Filed: Dec. 5, 1977

[51] Int. Cl.² .......................... H01H 9/02; H02G 3/08
[52] U.S. Cl. .................................... 200/296; 200/297; 200/293; 220/3.5
[58] Field of Search .................. 220/3.3, 3.4, 3.5, 3.7, 220/3.8, 3.9, 297; 200/293, 294, 296, 297; 174/55, 56, 58; 248/DIG. 6

[56] References Cited

U.S. PATENT DOCUMENTS

| | | | |
|---|---|---|---|
| 1,938,309 | 12/1933 | Williams | 174/55 |
| 2,002,491 | 5/1935 | Despard | 220/3.7 X |
| 2,183,892 | 12/1939 | Pitsch | 200/297 X |
| 2,889,437 | 6/1959 | Christensen | 200/297 |
| 4,009,797 | 3/1977 | Lee | 220/3.8 X |

Primary Examiner—Steven M. Pollard
Attorney, Agent, or Firm—Michael Ebert

[57] ABSTRACT

An adapter for an electrical wall fixture such as a wall light switch having a toggle or other actuator, the adapter serving to protrude the switch outside of the wall outlet box in which it is nested to the extent necessary to project the toggle through an opening in a fabric covering spaced from the wall. The standard switch includes a pair of mounting wings each having a slot therein to receive a primary screw for attaching the wing to the outlet box and a secondary screw which normally serves to hold a standard face plate over the switch to cover the outlet box. The adapter is constituted by a cover plate which overlies the outlet box and is provided with spacer elements to place the surface of the plate against the rear of the fabric covering. The cover plate has an opening to accommodate the toggle, a pair of slots which register with the wing slots and a pair of holes which register with the wing holes, whereby the switch may be secured to the rear of the cover plate by the secondary screws and the assembly of the cover plate and switch secured to the outlet box by the primary screws. The fabric covering is sandwiched between the cover plate and a transparent face plate attached thereto, the face plate having an opening therein which registers with an opening in the fabric covering to permit the toggle to project therethrough.

3 Claims, 11 Drawing Figures

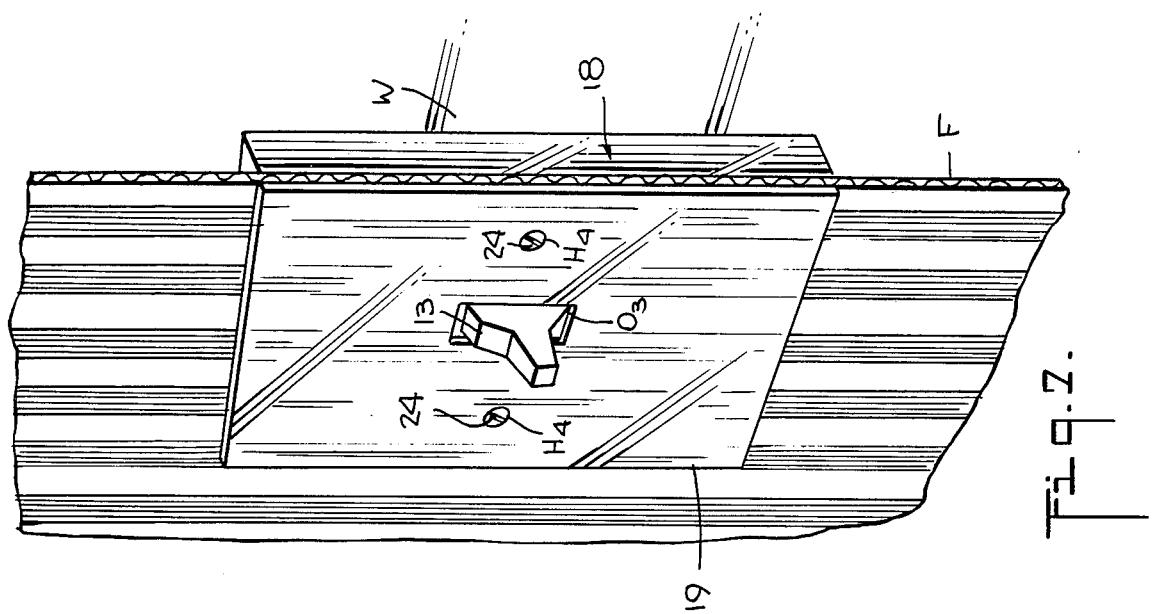
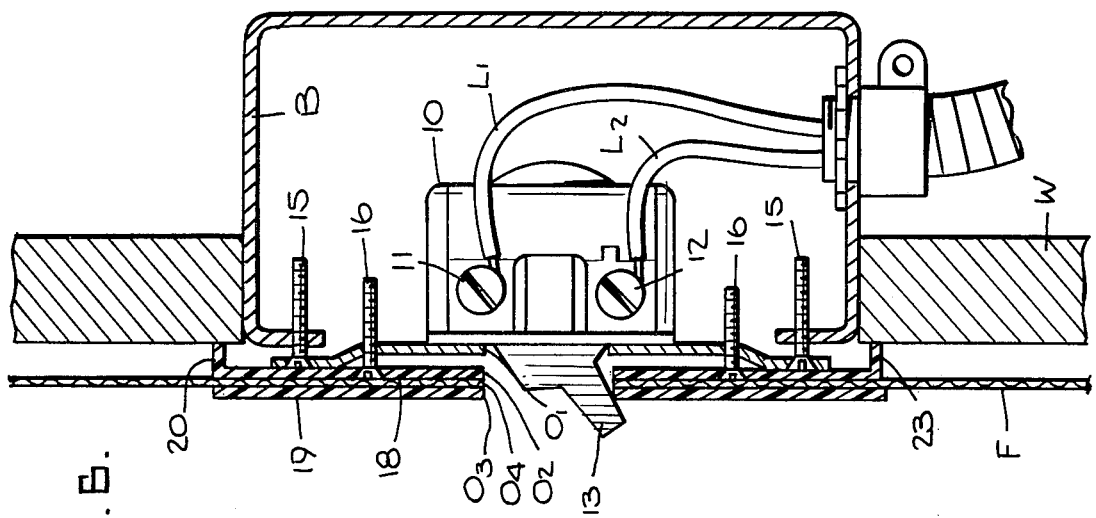
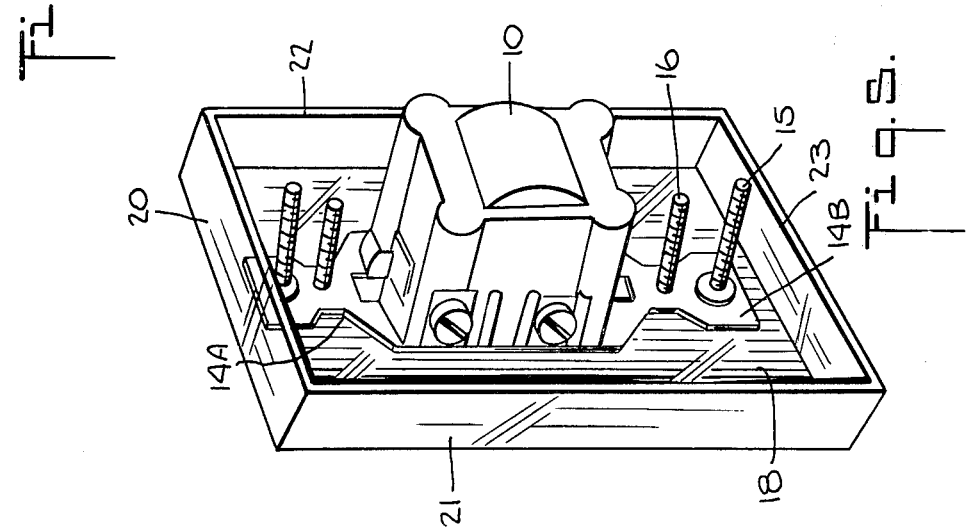

ADAPTER FOR STANDARD ELECTRICAL WALL FIXTURES

BACKGROUND OF INVENTION

This invention relates generally to standard electrical wall fixtures such as light switches and power outlets, and more particularly to an adapter serving to protrude the fixture outside of the wall outlet box in which it is nested to the extent necessary to project the fixture through an opening in a fabric wall covering spaced from the wall.

Baslow U.S. Pat. No. 4,018,260 discloses an arrangement of border pieces attachable to a wall to create a framework for supporting a fabric wall covering. In this arrangement, the fabric covering does not lie directly against the wall but is spaced therefrom, the fabric being tensioned by the border pieces to present a smooth surface. As pointed out in this patent, many advantages are gained in spacing a fabric covering from a wall; for imperfections, cracks and other irregularities in the wall surface are concealed by the tensioned fabric and are not reflected in the fabric surface as is the case when a fabric covering is directly adhered to the wall.

The Tombu U.S. Pat. No. 3,833,046 and the Billarant U.S. Pat. No. 3,657,850 also disclose wall mountings for fabric coverings in which the fabric is spaced at least one quarter of an inch from the surface of the wall. Fabric wall coverings of the type disclosed in the Baslow, Tombu and Billarant patents create a problem when the wall being covered has a standard electrical light switch or power outlet installation.

In a standard light switch installation, the switch is fully nested within an outlet box embedded in the wall, the toggle or actuator of the switch projecting through an opening in a face plate which overlies the box and is secured to the switch. Should one seek to accommodate a fabric wall covering of the above-described type to a standard light switch by cutting an opening in the fabric to permit the switch toggle to project therethrough, and then sandwich the fabric between the switch and the face plate attached thereto, this acts to distort the surface of the fabric. The reason for this is that the fabric covering is then spaced from the wall except at the switch installation where the plate presses the fabric against the wall.

In order to avoid such distortion, one could attach a spacer plate over the switch, and then sandwich the fabric between this plate and the face plate. But then the switch toggle is partly buried in the spacer plate and is difficult to manipulate. A similar problem arises when the fixture is in the form of a power outlet to receive the plugs of electrical appliances.

SUMMARY OF INVENTION

In view of the foregoing, the main object of this invention is to provide an adapter for a standard electrical wall fixture, the adapter in the case of a switch serving to protrude the switch outside of the wall outlet box in which it is nested to the extent necessary to project the switch actuator through an opening in a fabric covering spaced from the wall.

A significant advantage of one embodiment of an adapter in accordance with the invention is that it includes a cover plate which functions as a spacer between the wall and the fabric covering and in no way distorts the surface of the fabric. Also, because of the adapter, the toggle or switch actuator projects fully through an opening in the fabric and is as easily manipulated as in a standard wall installation.

Also an object of this invention is to provide an adapter whose cover plate serves to protrude the switch outside of the outlet box and cooperates with a transparent face plate, the fabric being sandwiched between the cover plate and the face plate, so that the decorative pattern of the fabric is exposed through the face plate.

In an installation using an opaque face plate overlying the fabric, the face plate introduces a discordant note, particularly when the fabric has an elaborate design which, to be fully effective, should be uninterrupted. But with the present arrangement, the transparent face plate reveals the design at the switch installation, the only discontinuity in the design being the switch actuator which is relatively inconspicuous.

Yet another object of the invention is an adapter which functions as a spacer between the wall and the fabric and which takes the form of a frame whose ends are provided with recesses to accommodate the mounting wings of the switch or power outlet fixture.

Another important advantage of an adapter in accordance with the invention is that the adapter may be installed without having to disconnect the fixture from the electrical line, so that the changeover from a standard installation to one adapted to a fabric covering spaced from the wall may be carried out without difficulty and without the need to enlist an electrician or other skilled personnel.

Briefly stated, these objects are accomplished by an adapter for a standard wall light switch or other fixture, the adapter serving to protrude the switch outside of the wall outlet box in which it is nested to the extent necessary to project the toggle of the switch through an opening in a fabric covering spaced from the wall.

The standard switch includes mounting wings on opposing sides of the actuator, each wing having a slot therein to receive a primary screw for attaching the wing to the outlet box and a secondary screw which normally serves to attach a standard face plate over the switch. In one embodiment, the adapter is constituted by a cover plate which overlies the outlet box and is provided with spacer elements to place the surface of the cover plate against the rear of the fabric covering. The cover plate has an opening therein to accommodate the toggle, a pair of oversize slots which register with the wing slots to provide access to the primary screws for attaching the wings to the outlet box, and a pair of holes which register with the wing holes, whereby the switch may be attached to the rear of the cover plate by the secondary screws. The fabric covering is sandwiched between the cover plate and a special transparent face plate attached thereto, the face plate having an opening therein which registers with the openings in the fabric covering and in the cover plate to permit the toggle to project therethrough whereby the toggle may be manipulated without difficulty despite the wall covering.

In another embodiment, the adapter takes the form of a portable frame which lies against the wall and surrounds the outlet box, the ends of the frame having recesses therein to accommodate the mounting wings of the fixture to protrude the fixture outside of the box.

OUTLINE OF DRAWINGS

For a better understanding of the invention as well as other objects and further features thereof, reference is made to the following detailed description to be read in conjunction with the accompanying drawings, wherein:

FIG. 5 is a rear perspective view of the cover plate;

FIG. 6 is a section taken through the wall outlet box when the adapter is installed, the wall having a fabric covering thereover;

FIG. 7 is a perspective view of the installation showing the transparent face plate of the adapter overlying the fabric covering;

DESCRIPTION OF INVENTION

The Standard Switch

Figure 1:
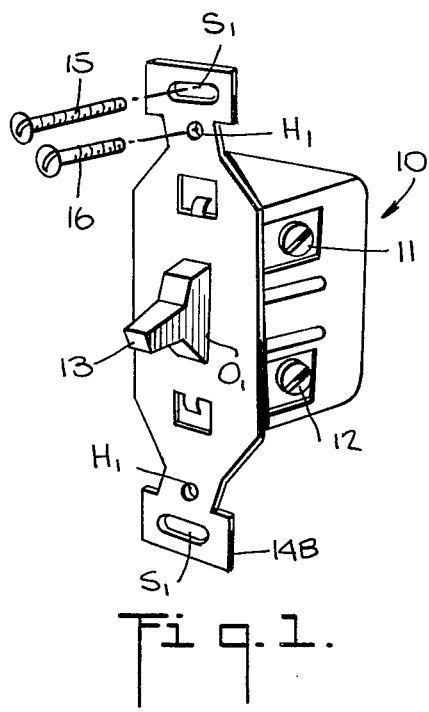
FIG. 1 is a perspective view of a standard electrical toggle switch.
Figure 2:
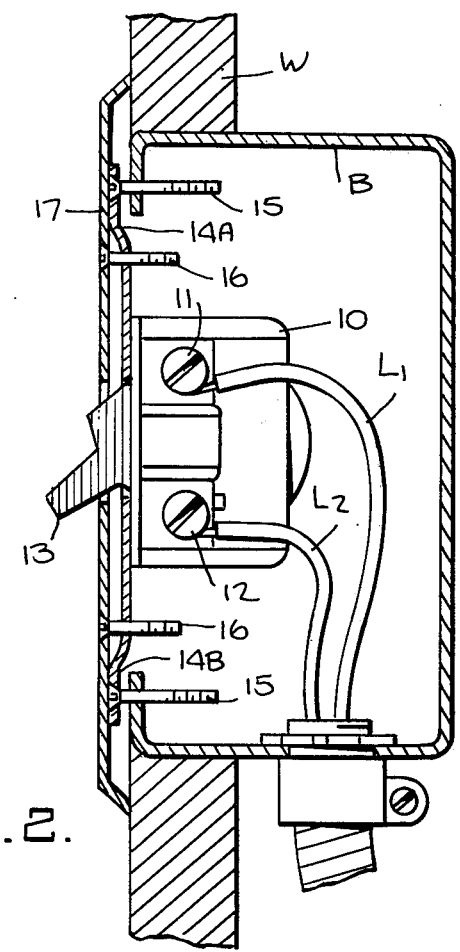
FIG. 2 is a section taken through a wall outlet box showing the standard switch nested therein in a conventional manner.
Figure 4:
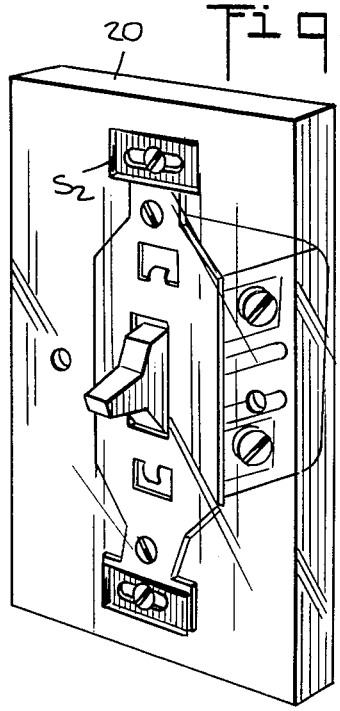
FIG. 4 is a front perspective view of the cover plate with the standard switch attached thereto.
Figure 3:
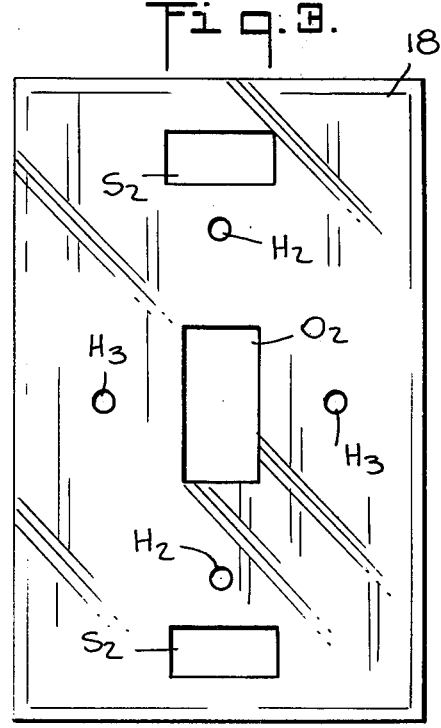
FIG. 3 is a front view of the cover plate of a first embodiment of an adapter in accordance with the invention.

Referring now to FIGS. 1 and 2, there is shown a standard electrical light switch 10 having screw-type terminals 11 and 12 to which current-carrying wires are attached. These wires are interconnected when the switch actuator or toggle 13 is in its "on" position and are disconnected when toggle 13 is in its "off" position. It is to be understood that the invention is applicable to other forms of standard switches, such as those having a push-button actuator.

Switch 10 is provided at its face with a metal mounting strip having a central opening $O_1$ to accommodate toggle 13. The strip includes a pair of wings 14A and 14B, each having a slot $S_1$ to receive top and bottom primary screws 15 and a threaded hole $H_1$ to receive top and bottom secondary screws 16.

As shown in FIG. 2, switch 10 is nested within an outlet box B embedded in a wall W, the electrical wires $L_1$ and $L_2$ being attached to terminals 11 and 12. Primary screws 15, which pass through slots $S_1$, are received in threaded holes in flanges in the outlet box, thereby securing the switch to the box. The elongated slots make it possible to adjust the position of the switch relative to the box. Secondary screws 16 go through holes in an opaque face plate 17 which lies against the wall and covers the outlet box, these screws being received in threaded holes $H_1$ in wings 14A and 14B to hold the face plate in position.

Where the fixture in the box is a female power outlet for receiving male plugs, the outlet has the same mounting wings as the switch illustrated herein.

The Adapter (First Embodiment)

Referring now to FIGS. 3 to 7, there is shown an adapter in accordance with the invention, the adapter being constituted by a cover plate 18 and a transparent face plate 19.

Cover plate 18 is provided with spacer elements to bring the surface of this plate against the rear of a fabric wall covering F which is spaced from wall W. These elements, in the embodiment shown, are constituted by side walls 20, 21, 22 and 23, whereby the cover plates takes the form of a shallow cover box. In practice, however, these elements may be formed by ribs or tabs on the rear of the cover plate.

Cover plate 18 is provided with a central opening $O_2$ to accommodate toggle 13 and a pair of opposed, oversized slots $S_2$ which are positioned to register with wing slots $S_1$ on the metal mounting strip. Also formed in cover plate 18 is a pair of holes $H_2$ which register with wing holes $H_1$ on the switch, and a pair of holes $H_3$ in either side of opening $O_2$ which register with the corresponding holes $H_4$ in face plate 18. A pair of tertiary screws 24 pass through holes $H_4$ in the face plate to be received in holes $H_3$ threaded in the cover plate to hold the face plate. Face plate 19 is provided with a central opening $O_3$ to accommodate toggle 13. Fabric F has an opening $O_4$ cut therein through which toggle 13 projects.

Thus when the adapter is installed, as shown in FIG. 6, fabric F is sandwiched between cover plate 18 and face plate 19, the rectangular opening $O_4$ in the fabric registering with opening O in switch 10 as well as openings $O_2$ and $O_3$ in the cover and face plates. The thickness of the cover plate corresponds to the space between fabric F and wall W so that the adapter in no way disturbs the planar surface of the tensioned fabric which is parallel to the wall surface.

Switch 10 is secured to outlet box 17 by primary screws 15, while cover plate 18 is secured to the wings of the switch mounting strip by secondary screws 16, and face plate 19 is secured to cover plate 18 by tertiary screws 24.

In installing the adapter without disconnecting the switch from the wires, one first withdraws the secondary screws 16 to release the standard face plate. This plate is then discarded, but the secondary screws are retained. Outlet box B is now exposed. One then turns out primary screws 15 to a point just short of full withdrawal from the threaded holes in the outlet box, so that it is now possible to pull switch 10 out from box B and against the rear of the cover plate 18, and to align wing holes $H_1$ of the switch with cover plate holes $H_2$. Cover plate 18 is then attached to switch 10 by secondary screws 16 going through these holes.

Then, by passing the head of a screwdriver through the oversize slots $S_2$ in the cover plate, one turns in primary screws 15 to retract switch 10 into box B until a point is reached where cover plate 18 is pressed firmly against the wall. The primary screws are tightened to maintain this condition, switch 10 now protruding from outlet box B to the extent necessary to project toggle 13.

When cover plate 18 is in place, one then mounts the fabric covering over the wall, opening $O_4$ being cut in this covering at a position in registration with opening $O_3$ in the cover plate. In addition, two punctures are made on either side of opening $O_4$ in the fabric covering to allow for tertiary screws 24 which serve to hold transparent face plate 19 over the fabric.

In the arrangement shown, primary screws 15 are never fully withdrawn from the outlet box, since cover plate 18 has oversize slots to provide screwdriver access thereto. Alternatively, instead of oversize slots in the cover plate, slots corresponding to the wing slots may be used, in which case the primary screws are fully withdrawn when removing the original face plate 17, and these primary screws are used to attach cover plate 18 to outlet box B, with switch 10 already attached to the cover plate.

Also, instead of tertiary screws to hold face plate 19 in place, the face plate may be provided with resilient prongs that snap into sockets in the cover plate so that no screw heads appear on the surface of the face plate.

Adapter (Second Embodiment)

Figure 8:
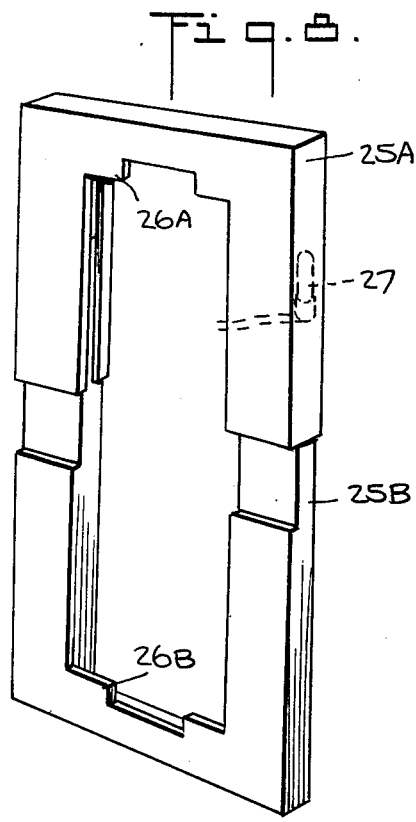
FIG. 8 shows in front perspective a second embodiment of an adapter in accordance with the invention.
Figure 10:
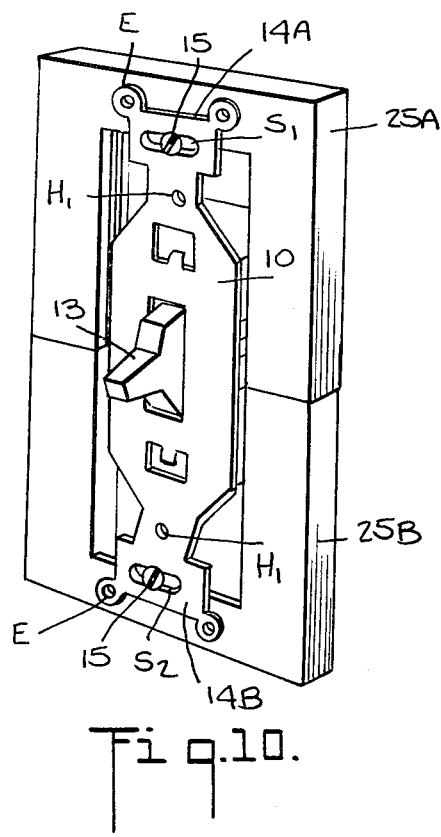
FIG. 10 shows the fixture held within the adapter.
Figure 9:
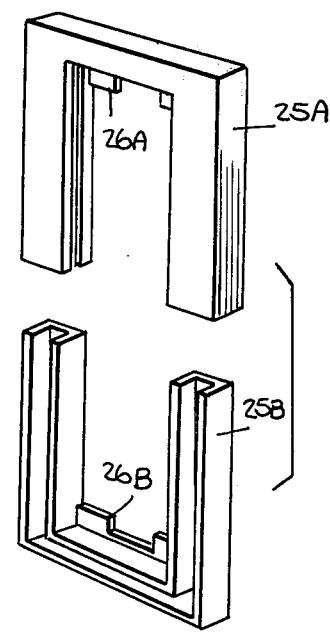
FIG. 9 is a rear perspective view of the adapter.

Referring now to FIGS. 8 to 10, there is shown another preferred embodiment of an adapter in accordance with the invention for protruding an electrical fixture in the form of a light switch 10 from the outlet box in which it is normally nested.

It will be noted that mounting wings 14A and 14B on either end of the mounting strip face are provided with a pair of ears E. These ears are normally included in standard switches, but are omitted in FIG. 1 only because they serve no function in the first embodiment of the invention. Wings 14A and 14B are provided with slots to receive primary screws 15 for securing the switch to the outlet box, and with threaded holes $H_1$ to receive secondary screws 16 (see FIG. 1) for attaching a face plate to the fixture.

The adapter, in this instance, is formed by a partible spacer frame which rests against the wall in the region surrounding the outlet box embedded therein. The rectangular frame is constituted by a pair of complementary half-pieces 25A and 25B formed of high-strength insulation material such as PVC. The complementary pieces include a tongue and groove snap-in joint to hold them together. The upper ends of the frame are provided with transverse flanges 26A and 26B having a central cut-out to accommodate the mounting wings 14A and 14B so that the ears E then abut the flange surfaces.

Thus to protrude switch 10 without disconnecting the current-carrying wires therefrom, primary screws 15 are loosened to an extent making it possible to pull out the switch from the outlet box to provide a spacing behind the wings into which one can interpose the separate pieces 25A and 25B of the frame. The pieces are then joined together, after which the screws are retightened to cause the ears of the mounting wings to press against the flanges of the frame, thereby holding the frame in place with the switch protruding from the box to an extent determined by the thickness of the frame.

When the adapter is used in conjunction with a fabric wall covering which is spaced from the wall, the fabric is then sandwiched between the face of switch 10 and the face plate secured thereto by secondary screws. The face plate has about the same dimensions as the spacer frame, the switch actuator going through a hole cut in the fabric.

However, this adapter, as well as the others disclosed herein, may also be used for other purposes in that by projecting the switch beyond the wall containing the outlet box, the spacer frame may serve to house auxiliary elements such as a pilot light bulb 27 connected to the power line, as shown in FIG. 8, which bulb is exposed through an opening in the edge of the frame to indicate the presence of the switch in a darkened room. Alternatively, the housing defined by the frame in combination with the outlet box may be used as an enlarged box to house the circuit elements of a smoke detector connected to the power line, the smoke sensor being mounted in the frame and being exposed through an edge opening therein.

Adapter (Third Embodiment)

Figure 11:
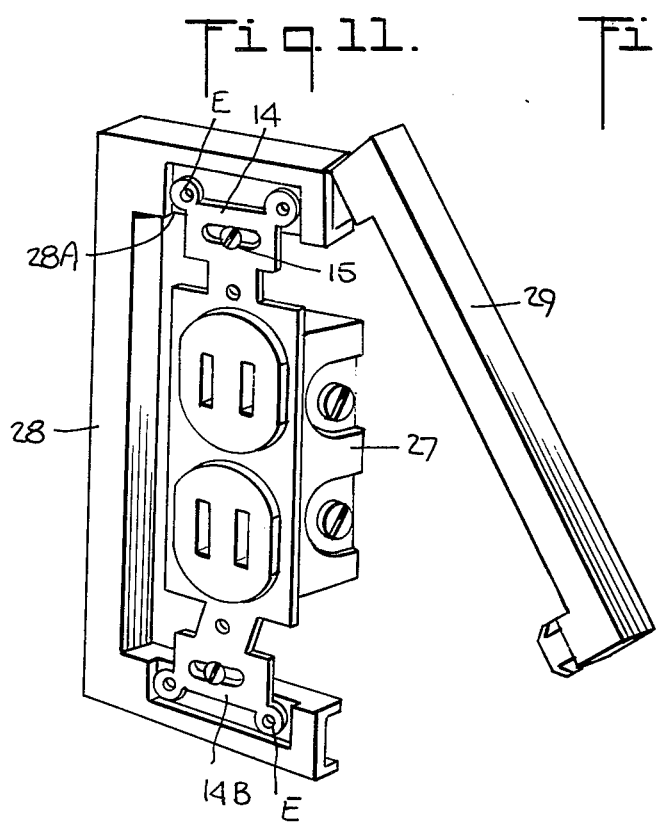
FIG. 11 is a perspective view of a third embodiment of the invention.

Referring now to FIG. 11 showing another embodiment of a spacer frame in accordance with the invention, the frame in this instance serves to protrude an electrical power outlet 27 outside of the outlet box in which it is normally nested. The power outlet is of the standard type having two female sockets adapted to receive male plugs. Outlet 27 includes mounting wings 14A and 14B and ears E which are the same as those shown in FIG. 10.

The partible frame in this instance is composed of a C-shaped section 28 having a bar section 29 hinged thereto which when interlocked with section 28 completes the frame. Also, instead of ears E resting against the outer surface of the frame, the ends of the frame are provided with shallow recesses 28A and 28B to accommodate the ears so that the surface of the wings is flush with the surface of the frame.

Thus when installing the frame, one first loosens primary screws 15 in order to pull out the outlet to an extent making it possible to interpose the frame between the wings and the region of the wall surrounding the outlet box, the bar 29 being then locked to section 28. The screws are then tightened to press the frame against the wall and hold the outlet in place, after which one attaches a face plate to the outlet. The plate has two port holes providing access to the sockets.

While there has been shown and described preferred embodiments of an adapter for a standard wall light switch or power outlet in accordance with the invention, it will be appreciated that many changes and modifications may be made therein without, however, departing from the essential spirit thereof. Thus in the embodiment shown in FIGS. 8 to 10, instead of flanges 26A and 26B, recesses may be provided to receive the ears E so that they are flush with the surface of the adapter.

I claim:

1. An adapter for a standard electrical wall fixture constituted by a light switch or power outlet normally nested within a power line outlet box embedded in the wall, the adapter serving to protrude the fixture outside of the outlet box to displace the face of the fixture relative to the wall, said fixture including a pair of mounting wings on either end of the face, each wing having a slot therein for attaching the wing to the outlet box by a primary screw going through the slot, the length of the screw being sufficient to effect attachment at the displaced position, said adapter comprising spacer means restable against the wall in the area surrounding the box, said spacer means being interposed between said wings and said wall whereby when the primary screws are tightened, the fixture is secured to the box at the displaced position, said spacer means being constituted by a partible rectangular frame which surrounds the box, the wings resting against the ends of the frame, said partible frame being formed of a complementary pair of half-sections which are interconnectable.

2. An adapter for a standard electrical wall fixture constituted by a light switch or power outlet normally nested within a power line outlet box embedded in the wall, the adapter serving to protrude the fixture outside of the outlet box to displace the face of the fixture relative to the wall, said fixture including a pair of mounting wings on either end of the face, each wing having a slot therein for attaching the wing to the outlet box by a primary screw going through the slot, the length of the screw being sufficient to effect attachment at the displaced position, said adapter comprising spacer means restable against the wall in the area surrounding the box, said spacer means being interposed between said wings and said wall whereby when the primary screws are tightened, the fixture is secured to the box at the displaced position, said spacer means being constituted by a partible rectangular frame which surrounds the box, the wings resting against the ends of the frame, said partible frame being formed by a C-shaped section to which a bar-shaped section is hinged to complete the frame.

3. An adapter as set forth in claim 1 wherein said frame has an electrical device mounted therein which is connected to said power line.

* * * * *